(12) United States Patent
Thomas

(10) Patent No.: US 6,893,484 B2
(45) Date of Patent: May 17, 2005

(54) LOW OPERATING PRESSURE GAS SCRUBBER

(75) Inventor: Paul E. Thomas, Odessa, TX (US)

(73) Assignee: Desert Energy LTD, Odessa, TX (US)

( * ) Notice: Subject to any disclaimer, the term of this patent is extended or adjusted under 35 U.S.C. 154(b) by 44 days.

(21) Appl. No.: 10/679,208

(22) Filed: Oct. 6, 2003

(65) Prior Publication Data

US 2005/0072299 A1 Apr. 7, 2005

(51) Int. Cl.$^7$ .............................................. B01D 47/02
(52) U.S. Cl. ............................ 95/226; 95/235; 96/353; 96/354; 261/123; 261/124; 422/231
(58) Field of Search ........................... 261/122.1, 123, 261/124, DIG. 9; 96/351–354; 95/226, 235; 422/231; 210/221.2

(56) References Cited

U.S. PATENT DOCUMENTS

| | | | | |
|---|---|---|---|---|
| 750,155 | A | * 1/1904 | Boggs | 261/137 |
| 829,375 | A | * 8/1906 | Garvey | 261/70 |
| 941,676 | A | * 11/1909 | Green | 261/77 |
| 1,018,996 | A | * 2/1912 | Swett | 202/93 |
| 2,334,232 | A | * 11/1943 | Wells | 12/41.5 |
| 3,516,647 | A | * 6/1970 | Jaffe et al. | 261/24 |
| 3,566,583 | A | * 3/1971 | Ashmore | 96/344 |
| 3,711,072 | A | * 1/1973 | Waldenville | 261/122.1 |
| 3,803,812 | A | * 4/1974 | Romero | 96/241 |
| 4,330,510 | A | 5/1982 | Schauer et al. | 423/210 |
| 4,350,505 | A | 9/1982 | Mallory et al. | 96/249 |
| 4,511,379 | A | 4/1985 | Hauptmann | 96/290 |
| 4,564,447 | A | * 1/1986 | Tiedemann | 210/220 |
| 4,722,799 | A | 2/1988 | Ashbrook et al. | 210/722 |
| 4,933,118 | A | 6/1990 | Meston | 261/123 |
| 5,064,450 | A | 11/1991 | Lankton et al. | 95/211 |
| 5,102,583 | A | 4/1992 | Bannon | 261/114.1 |
| 5,376,311 | A | 12/1994 | DeGuzman | 261/77 |
| 5,713,971 | A | 2/1998 | Rohrbach et al. | 96/181 |
| 5,730,784 | A | 3/1998 | Smith et al. | 95/181 |
| 5,851,389 | A | 12/1998 | Brewster et al. | 210/264 |
| 6,004,381 | A | 12/1999 | Rohrbach et al. | 95/211 |
| 6,506,352 | B1 | 1/2003 | Lindfors et al. | 423/240 S |
| 6,547,855 | B1 | * 4/2003 | Schmidtke | 95/149 |

FOREIGN PATENT DOCUMENTS

| DE | 337804 | * 6/1921 | 261/124 |
|---|---|---|---|

* cited by examiner

*Primary Examiner*—Richard L. Chiesa
(74) *Attorney, Agent, or Firm*—Christopher J. Whewell (57) ABSTRACT

Provided herein is an apparatus for scrubbing either acidic or alkaline impurities from gas streams, wherein the gas streams to be scrubbed exist at a pressure which is only slightly higher than ambient pressure. An apparatus according to a preferred form of the invention exists substantially in the shape of a rectangular or cubic solid, having an inlet pipe which is directed to an inner chamber having a wall portion which functions as a manifold, including a plurality of gas conduction tubes in fluid contact with the inner chamber, and into which tubes the gas to be scrubbed enters. The gas to be scrubbed passes through holes in the walls of the gas conduction tubes and contacts a liquid absorbent substance present in the interior confines of the apparatus, which liquid is capable of reacting with one or more impurities in the gas stream, thus eliminating the impurities from the gas stream. The gas stream so treated emerges from the apparatus through a gas outlet provision.

27 Claims, 6 Drawing Sheets

Fig 6

LOW OPERATING PRESSURE GAS SCRUBBER

TECHNICAL FIELD

This invention relates to gas scrubbing equipment. More particularly it relates to equipment suitable for scrubbing either acidic or alkaline impurities from gas streams, wherein the gas stream to be scrubbed exists at a pressure which is only slightly higher than ambient pressure.

BACKGROUND

The prior art is replete with various examples of devices and methods for the removal or "scrubbing" of certain undesirable gaseous components from gas streams in general. One area in which a large number of developments have been made is in the scrubbing of gases produced during oil recovery and storage operations. During such operations, poisonous hydrogen sulfide present presents a health hazard to workmen in the area. To protect the workmen and the public-at-large, the permissible conditions and levels for emissions of hydrogen sulfide are regulated by various regulatory agencies. A few exemplary developments from the prior art follows, each of which are herein incorporated by reference thereto.

U.S. Pat. No. 750,155 teaches a device having a suction producing means and a water tank vertically discharging air through a nozzle below the surface of the water in the tank. There is a sleeve loosely surrounding the nozzle and terminating at its upper end just above the surface of the water, and a cap located a short distance above the upper end of the sleeve.

U.S. Pat. No. 941,676 describes an apparatus for supplying atmospheres of various humidities having: a) an air pump and a means for its operation; b) an air humidifying tank containing water; c) an air tank; d) an exit pipe leading from each tank to the pump; e) a pipe leading from the air tank to beneath the water level of the humidifying tank; and f) a valve mechanism adapted to open communication directly between the air tank and the pump, or indirectly through the humidifying tank.

U.S. Pat. No. 1,018,996 provides a tobacco smoke absorption apparatus having a receptacle for containing liquid, a vertical pipe projecting through the top of the receptacle and having its lower open end terminating adjacent to the bottom of the receptacle, a combustion chamber having an open lower end, and a grating above same, wherein the combustion chamber is mounted on the upper end of the vertical pipe. It further includes a means for causing a downward draft from the combustion chamber and up through the liquid containing receptacle and above it.

U.S. Pat. No. 4,330,510 sets forth a method of scrubbing noxious gas from a gas stream which comprises: a) filling a closed upstanding container having a bottom, a side wall, and a top cover with a gas washing liquid to a predetermined level, the container having a baffle plate mounted substantially horizontally in the container above the predetermined liquid level and being spaced from the side wall of the container about at least substantially the entire periphery of the baffle plate to permit cleansed gas to escape, the space between the baffle plate and the gas washing liquid being substantially unobstructed, the baffle plate having a surface facing the liquid in the lower portion of the container as gas is driven therethrough and to act as an impact wall against which gas-containing bubbles impinge; b) pumping a gas to be processed into at least one drive pipe having an inlet positioned outside of the container and extending into the container with an outlet near the bottom of the container appreciably below the predetermined liquid level to direct the gas stream substantially vertically into the bottom of the container and to form gas-containing bubbles in the gas washing liquid; c) discharging cleansed gas escaping around the periphery of the baffle plate from the container through an outlet stack, the outlet stack communicating with the interior of the container above the baffle plate; and d) impacting the gas-containing bubbles against the baffle plate to cause the gas-containing bubbles to recirculate through the liquid before passing outwardly around the periphery of the baffle plate.

U.S. Pat. No. 4,350,505 discloses a device for treating gases containing nitrogen for utilizing the nitrogen for reduction of oxygen content in well bore drilling fluids and comprising: a) a housing means; b) a chamber provided in the housing means and having a suitable filter material disposed therein to provide a filter chamber; c) a chamber provided in the housing means below the filter chamber and having a suitable liquid disposed therein to provide a liquid bath chamber d) a stand-pipe means disposed in the housing means and providing communication between the filter chamber and the liquid bath chamber; e) a level control means for controlling the level of the liquid bath in the liquid bath chamber; f) a first discharge means in communication with the liquid bath for discharge of the liquid bath; g) a second discharge means in communication with the liquid bath chamber and disposed above the upper level of the liquid bath; h) a means disposed in the liquid bath chamber and disposed above the upper level of the liquid bath to provide a tortuous path of travel between the liquid bath and the second discharge means; i) an inlet means providing access to the interior of the filter chamber for admitting the nitrogen containing gases thereto; and j) a means operably connected with the second discharge means for creating a suction within the housing means for pulling the gases through the filter chamber and liquid bath for removing unwanted debris from the gases and discharging clean gases from the device, including spreader plate means disposed in the filter chamber for dispersing the exhaust gases upon initial entry thereof into the filter chamber.

U.S. Pat. No. 4,511,379 teaches a gas scrubber comprising a first chamber having: a) inner and outer concentric substantially circular side walls each of constant diameter; b) a first end wall extending between corresponding end edges of the side walls; c) a helical second end wall extending between corresponding end edges of the side walls and once therearound to adjacent the first end wall; d) a gas inlet in the outer wall adjacent the position of maximum height thereof, the gas inlet being positioned so as to direct gas passing therethrough tangentially between the side walls; e) a plurality of fluid nozzles disposed on the inner wall so as to spray liquid toward the outer wall; f) gas outlets extending substantially around a side wall and dimensioned so that the velocity of the gas flowing between the walls is substantially constant; and g) liquid outlet means to allow liquid to leave the gas scrubber.

U.S. Pat. No. 4,722,799 describes an apparatus for continuously desulphurizing natural gas and regenerating a reaction solution comprising: a) a contacting means comprised of a tower and solution removal means, the contacting means for contacting natural gas with the reaction solution to substantially oxidize sulphurous compounds in the natural gas; b) a treating means comprised of a collector tank and a recycling means, the recycling means operably connected to the contacting means and the collector tank, the treating means for continuously regenerating the reaction solution, the recycling means for circulating the reaction solution through the contacting means and the treating means; c) a degassing means operably connected to the contacting means and the treating means, the degassing means for removing entrained gases from the reaction solution, wherein the degassing means is comprised of a colloid mill and wherein the recycling means reduces sulphurous compounds in the solution and causes sulphur to precipitate from the solution, the sulphur being removed by a removal mechanism.

U.S. Pat. No. 4,933,118 provides a portable gas scrubbing apparatus comprising: a) oblong casing means for containing a treatment fluid; b) inlet duct means in one end of the casing means for introducing gas into the bottom of the one end of the casing means; c) a first inclined baffle means extending between the sides of the casing means from the one end of the casing means to proximate the other end of the casing means; d) a second inclined baffle means above the first inclined baffle means extending between the sides of the casing means from the other end of the casing means to proximate the one end of the casing means, whereby, when gas is introduced into the casing means to the treatment fluid and the baffle means, the baffles define a circuitous path for gas introduced through the inlet means into the treatment fluid beneath the first baffle means at the one end of the casing means to the top surface of the fluid, thereby ensuring good contact between the gas and the treatment fluid; and outlet duct means in the top of the casing means for discharging treated gas from the casing means. The inlet duct means extends into the casing beneath the first baffle means proximate the one end of the casing means for introducing the gas beneath the first baffle means and horizontal tube means connected to the inlet duct means beneath the first baffle means for distributing the gas beneath the first baffle means.

U.S. Pat. No. 5,064,450 sets forth a gas absorber for removing at least one gaseous component from a flowing gas stream by contacting the gas stream with a lean liquid stream to absorb at least a portion of the gaseous component to produce a rich liquid stream comprising the gaseous component and a flowing gas stream having a reduced concentration of the gaseous component which absorber comprises: a) a double wall forming an annulus having a means for restricting fluid flow into the bottom of the gas absorber from the bottom of the annulus and a means for passing fluid out of an upper section of the annulus into the gas absorber; b) an inlet for the lean liquid stream having a locus in the upper end of the gas absorber; c) an inlet for the flowing gas stream; d) an outlet for the rich liquid stream having a locus in the lower end of the gas absorber; e) an outlet for the flowing gas stream having a reduced concentration of the gaseous component; and f) at least one inlet communicating with the lower end of the annulus which inlet is used to introduce a lean liquid stream at least a portion of which flows upwardly through the annulus and overflows from the top of the annulus and thereby protecting at least a portion of the outer wall from contact with the flowing gas stream.

U.S. Pat. No. 5,102,583 discloses an apparatus for contacting a gas and a liquid comprising: a) a substantially vertical column containing a plurality of substantially horizontal contacting trays is which contacting tray is provided with passages for gas and liquid and wherein at least one of the contacting trays is a control tray; b) a liquid inlet provided in the upper section of the column; c) a gas outlet located above the uppermost contacting tray; d) a gas inlet provided in the lower section of the column; e) a liquid outlet below the lowermost contacting tray; f) a means for controlling the flow of liquid from the control tray; and g) a differential pressure controller responsive to means sensing the density of the mixture of gas and liquid at least one contacting tray above the control tray which controller communicates with the means for controlling the flow of liquid from the control tray and wherein the differential pressure controller is activated by the pressure difference between the space above the uppermost contacting tray and the space below the control tray.

U.S. Pat. No. 5,376,311 teaches an apparatus for mixing gas and liquid comprising: a) a generally rectangular concrete base; b) a vertically extending cylindrical housing mounted on the concrete base and having a hollow interior, and open top end portion and a bottom portion embedded on the concrete base, the bottom portion being provided with horizontal reinforcing bars passing through the walls of the cylindrical housing to anchor the housing with the concrete base, the cylindrical housing being provided with a plurality of apertures disposed at the lower section thereof proximate the concrete base; c) gas diffuser means concentrically held inside the cylindrical housing; the gas diffuser means being defined by an elongated porous tubular member provided with a cap fitted at the top end portion thereof and an elbow fitting detachably secured at the bottom end portion thereof; d) an inlet means consisting of a main pipe having opposite first and second ends, the first end being fitted on the elbow fitting and the second end being connected to a main air supply; and e) a holder means snugly fitted and screwably secured inside the cylindrical housing, the holder means being adapted to hold the porous tubular member in a vertical position as gas from the main supply is distributed therein.

U.S. Pat. No. 5,713,971 describes a cabin air filtration system for removing gas phase contaminants comprising: a) a cavity; b) an air flow path through the cavity; c) a liquid inlet into the cavity; d) a liquid outlet from the cavity; e) a fibrous wicking material having a plurality of elongated strands which are aligned to define a mesh within the cavity, the strands each having a hollow internal region extending longitudinally along the strand connected to an outer surface through at least one slot extending longitudinally along the strand, the hollow internal region transferring liquid from the inlet to the outlet along a path transverse to the air flow path; f) a means for supplying a gas absorbing liquid to the inlet; g) a means for conveying the gas absorbing liquid and any absorbed gases therein from the liquid outlet; and h) a means for circulating air from a cabin, through the mesh along the air flow path, the cavity and back into the cabin, the gas phase contaminants being communicated to the gas absorbing liquid through the slot in the fiber wicking material whereby the gas phase contaminants are absorbed by the gas absorbing liquid retained in the hollow region without essentially affecting the air flow through the mesh.

U.S. Pat. No. 5,730,784 provides a process for the removal of hydrogen sulfide from a gas stream containing hydrogen sulfide, which comprises: a) oxidizing a portion of the hydrogen sulfide therein to form sulfur dioxide therefrom and to produce an oxidized gas stream containing sulfur dioxide and a stoichiometric excess of hydrogen sulfide; b) reacting substantially all the sulfur dioxide in the oxidized gas stream with hydrogen sulfide remaining in the oxidized gas stream in a first liquid phase to form sulfurous material therefrom contained in the first liquid phase and to produce a further gas stream having a decreased and residual hydrogen sulfide content; c) oxidizing substantially all hydrogen sulfide remaining in the further gas stream in a second liquid phase to form a sulfurous material therefrom contained in the second liquid phase and to produce a gas stream substantially free from gaseous sulfur compounds, and d) venting the gas stream substantially free from gaseous sulfur compounds.

U.S. Pat. No. 5,851,389 sets forth a device arranged to be longitudinally inserted and removed from a conduit, and arranged to be positioned at a desired location along the conduit to remove a contaminant from a fluid flowing through the conduit, comprising a container having an axis, the container having: a) a first wall generated about the axis, the first wall being permeable to the fluid stream; b) a second wall generated about the axis, the second wall being spaced from the first wall and being permeable to the fluid stream; c) the first wall defining a first volume; d) the first and second walls defining a second volume therebetween; e) a first member sealing the first and second volumes at one end of the container; f) a second member sealing the second volume at the other end of the container, g) the second volume occupied by filter material; and h) a expandable barrier impervious to the fluid stream positioned adjacent the other end and selectively forming a seal between the second wall and the wall of the conduit. The device may be longitudinally inserted into a conduit and moved to a desired position therealong, and the barrier may be selectively expanded to seal the space between the second wall and the conduit wall, so that the fluid stream flowing through the conduit will be sequentially directed into the first volume, through the first wall, into the second volume where the filter material removes the contaminant from the fluid, and through the second wall.

U.S. Pat. No. 6,004,381 discloses an apparatus for removing gas phase molecules from a fluid stream comprising: a) a plurality of elongated fibers each having a longitudinally extending hollow internal cavity including an opening extending longitudinally along the fiber from the internal cavity to the outer fiber surface; b) a liquid which can absorb the gas phase molecules disposed within the internal cavities of the plurality of elongated fibers; c) a flow path for the fluid stream, containing the gas phase molecules to be removed, directed over a portion of the plurality of elongated fibers whereby the gas phase molecules to be removed are absorbed by the liquid; and d) a means for directing the fluid stream along the flow path.

U.S. Pat. No. 6,506,351 discloses a process for removing nitrogen oxides from a gas stream comprising: a) feeding the gas stream to a nitrogen oxides adsorber selected from the group consisting of a multi-fixed bed adsorber and a rotary wheel adsorber containing a metal oxide based chemisorbent or an adsorbent selected from the group consisting of Y zeolites, gamma alumina, treated gamma alumina, and supported MgO, whereby the nitrogen oxides are adsorbed in the adsorber; and b) feeding an ozone and oxygen containing gas stream to the adsorber, whereby the ozone reacts with the nitrogen oxides to form $N_2O_5$.

The prior art includes many more examples of developments directed to similar subject matter. However, none of the prior art devices provide a relatively portable device which is capable of scrubbing gases like hydrogen sulfide from the headspaces of storage tanks or other locations or sources at which the pressure of the gas to be scrubbed exists at a pressure which is only slightly elevated over atmospheric pressure. The present invention provides such apparatus.

SUMMARY OF THE INVENTION

The present invention provides a device useful for scrubbing contaminants from gaseous streams comprising:

a) an enclosure comprising a bottom portion, a rear wall portion, a front wall portion, a left side wall portion and a right side wall portion, wherein the left side wall portion and the right side wall portion each include a hole disposed therethrough, one of said holes being a gas inlet and the remaining hole being a gas outlet; and b) a gas manifold portion comprising:
  i) a substantially vertically disposed plate portion, the plate portion having an upper end portion, a lower end portion, two side edge portions, and a plurality of holes disposed through it along its lower end portion,
  ii) a plurality of gas conduction tubes coinciding with the number of plurality of holes disposed through the plate portion along its lower end portion, each of the gas conduction tubes having a first open end portion and a second closed end portion, wherein the open end portion of each of the gas conduction tubes are affixed over the holes disposed through the plate portion, the gas conduction tubes each comprising a plurality of holes disposed along their lengths,
  iii) a substantially horizontally disposed plate top portion having two end portions and two edge portions located at the upper end portion of the plate portion such that the angle of intersection the plate top portion makes with the plate portion is any angle between about 45 degrees and 135 degrees, wherein the lower end portion of the plate portion is sealed along its length to the bottom portion of the enclosure, and wherein each of the side edge portions of the plate portion are sealed along each of their lengths to the front wall portion and the rear wall portion of the enclosure, respectively, and wherein each of the end portions of the plate top portion are sealed along their lengths to the front wall portion and the rear wall portion of the enclosure and wherein the edge portion of the plate top portion which does not intersect with the plate portion is sealed along its length to the left side wall portion of the enclosure, thus defining a sealed chamber defined by the plate portion, the plate top portion, a portion of the front wall portion of the enclosure, a portion of the rear wall portion of the enclosure, and a portion of the left side wall portion of the enclosure.

DETAILED DESCRIPTION

Figure 1:
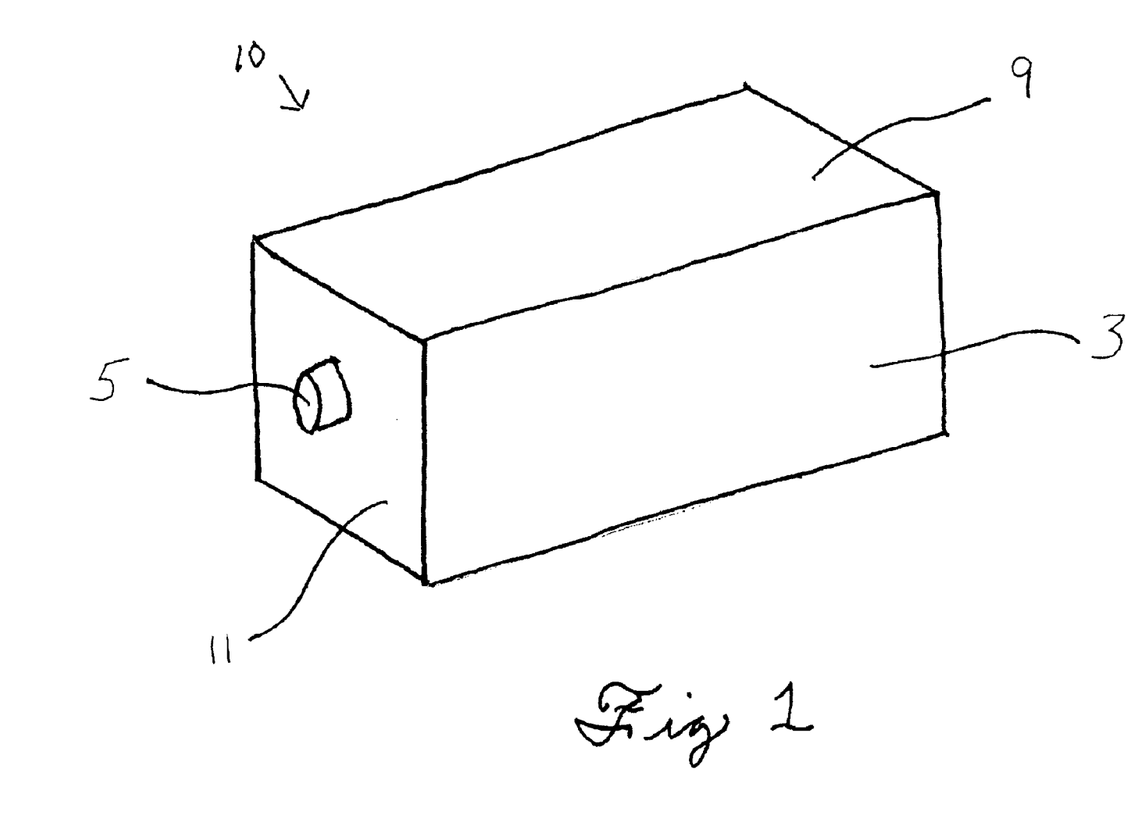
FIG. 1 shows a perspective view of a gas scrubbing apparatus according to the invention.

Referring to the drawings and initially to FIG. 1 there is shown a perspective view of a gas scrubbing apparatus 10 according to the invention existing substantially in the form of a rectangular solid and having a front wall portion 3, top portion 9, left side wall portion 11, and gas inlet hole 5.

Figure 2:
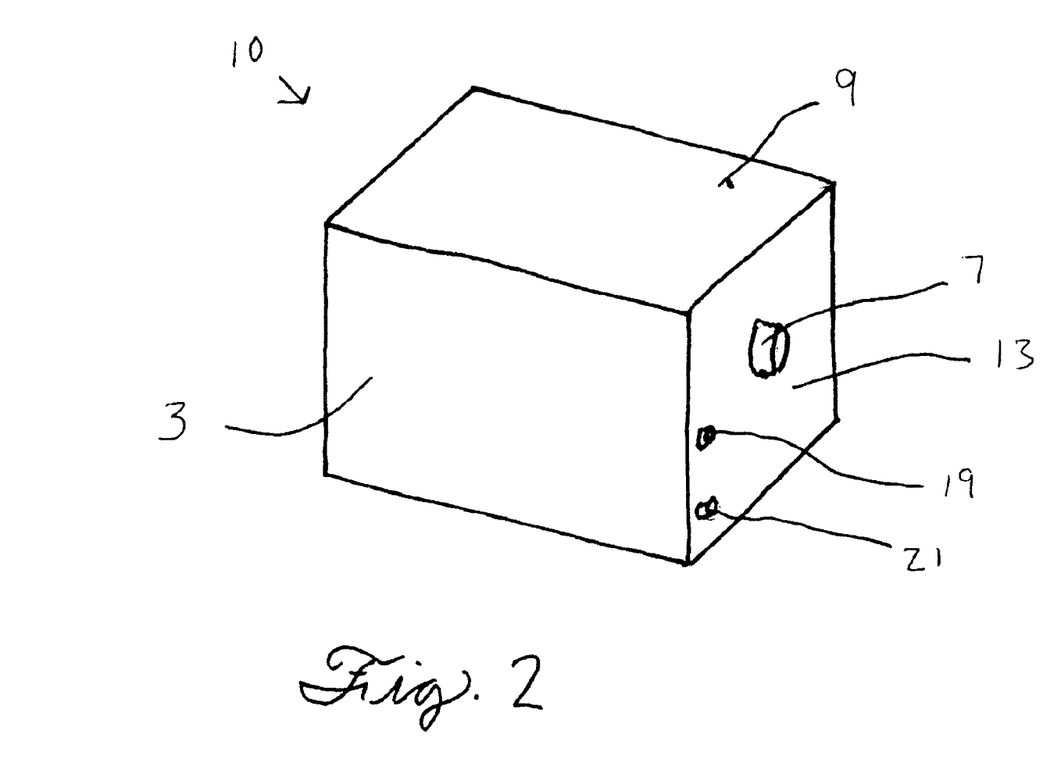
FIG. 2 shows a perspective view of a gas scrubbing apparatus according to the invention.

FIG. 2 shows a perspective view of a gas scrubbing apparatus 10 according to the invention having front wall portion 3, top portion 9, right side wall portion 13, gas outlet hole 7, liquid inlet hole 19, and liquid drain hole 21.

Figure 3:
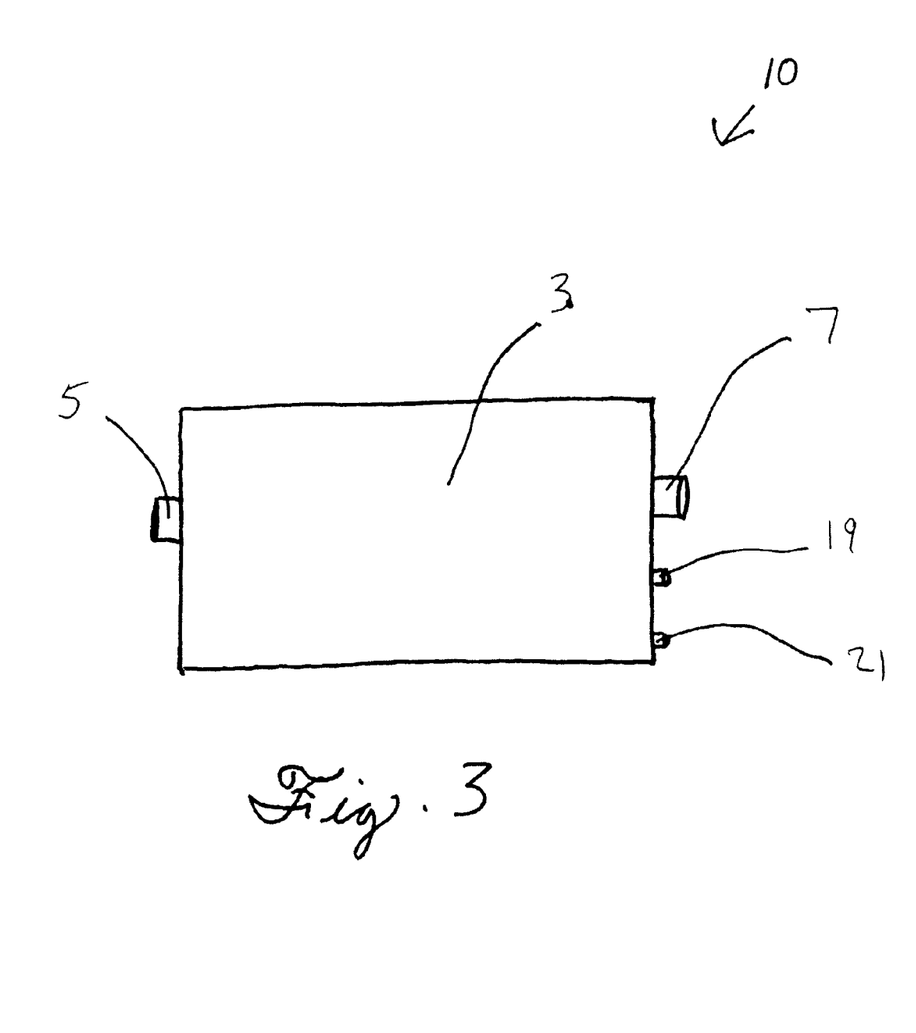
FIG. 3 shows a side view of a gas scrubbing apparatus according to the invention.

In FIG. 3 is shown a side view of a gas scrubbing apparatus 10 according to the invention showing the respective locations of the gas inlet hole 5, gas outlet hole 7, liquid inlet hole 19, liquid drain hole 21, and front wall portion 3.

Figures 4A, 4B, 4C:
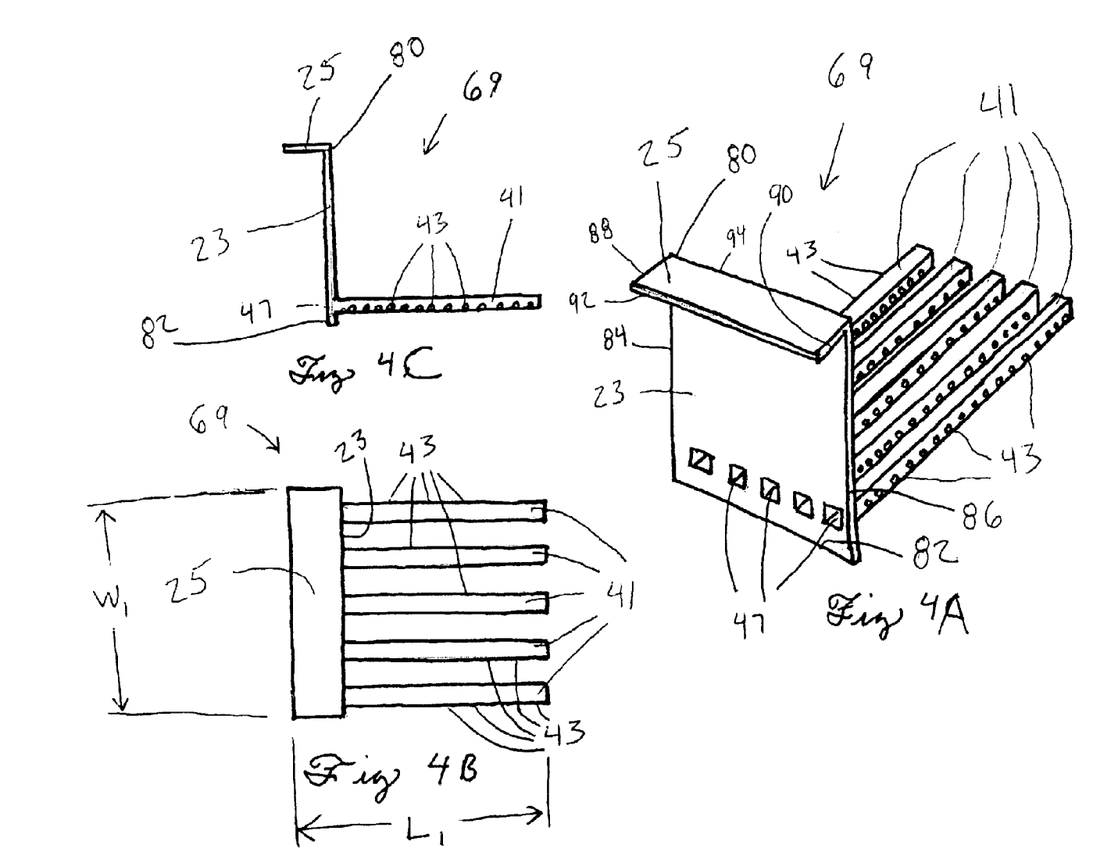
FIG. 4A shows a perspective view of a gas manifold useful in providing a gas scrubbing apparatus according to the invention.
FIG. 4B shows an overhead perspective view of a gas manifold useful in providing a gas scrubbing apparatus according to the invention.
FIG. 4C shows a side perspective view of a gas manifold useful in providing a gas scrubbing apparatus according to the invention.

In FIG. 4A there is shown a perspective view of a gas manifold 69 useful in providing a gas scrubbing apparatus according to the invention, wherein the gas manifold comprises a vertically-disposed plate portion 23 having an upper end portion 80, a lower end portion 82, and two side edge portions 84 and 86, wherein there is a plate top portion 25 disposed at the upper end portion of the plate portion 23 such that the plate top portion 25 makes an angle of any value between about 45 degrees and 135 degrees at the point of its intersection with the plate portion 23; preferably this angle is about 90 degrees. The manifold 69 also includes a plurality of hollow gas conduction tubes 41, each of which have one open end and one closed end, wherein the open end portion of the gas conduction tubes are attached to the lower portion of the plate 23, over holes 47 disposed through the plate 23 just above its lower portion. According to one preferred form of the invention, each of the gas conduction tubes 41 are themselves provided a plurality of holes 43 disposed on both their sides, along their entire length. The conduction tubes 41 are preferably square in cross-section; however the use of conduction tubes having other cross-section geometries are within the scope of this invention, including round cross-sections, oval cross sections, triangular cross sections, rectangular cross sections, rhombohedral cross sections, trapezoidal cross sections, pentagonal cross sections, hexagonal cross sections, etc. In all cases, including those where cross sectional geometries other than square or rectangular are employed, the holes 43 are disposed so that their axes are disposed at about a right angle with respect to the length dimension of the gas conduction tubes 41. The plate top portion 25 includes two end portions 88 and 90, and two edge portions 92 and 94.

The gas conduction tubes 41 are preferably affixed to the plate portion 23 by welding, as both the plate portion 23 and gas conduction tubes 41 comprise iron or steel in a preferred form of the invention. This is accomplished by first providing the plate portion 23 to have a plurality of holes 47 disposed at its lower portion which conform substantially to the cross section of the gas conduction tubes 41, but are slightly smaller in cross sectional area than the cross sectional area defined by the outer perimeter of the cross section of the gas conduction tube at its intersection with the plate portion 23, so as to enable a sound seal, ensuring that all of the open space defined by each of the holes 47 is within the confines of the cross section of the gas conduction tubes 43 at their open ends. The open end of each of the gas conduction tubes 43 are placed over each hole 47 in the plate portion 23, and welded in position.

The plate top portion 25 is preferably attached to the plate portion 23 by welding in one form of the invention. According to an alternate form of the invention, the plate top portion 25 is of singular construction as the plate portion 23, i.e., it is the same piece, and the angle between 45 and 135 degrees at the intersection of the plate top portion 25 and plate portion 23 has been imparted by the bending of a single sheet of plate steel using a brake and shear or other metal bending device, as such machines for bending steel are known in the art. Materials of construction other than steel are contemplated for providing the gas manifold 69 useful in providing an apparatus 10 according to the present invention, including other metals such as stainless steel, aluminum, zinc, titanium, copper, brass, and other alloys. Additionally, the invention comprises the use of composite materials, such as fiberglass, graphite-reinforced composites, etc., as well as polymer sheets such as PVC, CPVC, polypropylene homopolymers, copolymers of propylene and ethylene, polyethylene, ethylene-vinyl acetate copolymers, and other organic polymers known in the art as possible materials of construction of all elements of the invention.

FIG. 4B shows an overhead view of a gas manifold 69 useful in providing a gas scrubbing apparatus 10 according to the invention, with its gas conduction tubes 41 affixed to the plate portion 23. Also shown in this figure is the plate top portion 25, and the locations of the plurality of holes 43 disposed about both of the side walls of each of the gas conduction tubes 41 in this embodiment in which the gas conduction tubes are of a square cross section. Also shown in this FIG. 4B is the width dimension $W_1$ of the gas manifold 69 at its widest point, and its length dimension $L_1$.

FIG. 4C shows a side perspective view of a gas manifold 69 useful in providing a gas scrubbing apparatus 10 according to the invention, having plate portion 23, plate top portion 25, and gas conduction tubes 41. The location of the holes 43 is also shown disposed on the side wall portions of the gas conduction tubes.

Figure 5A:
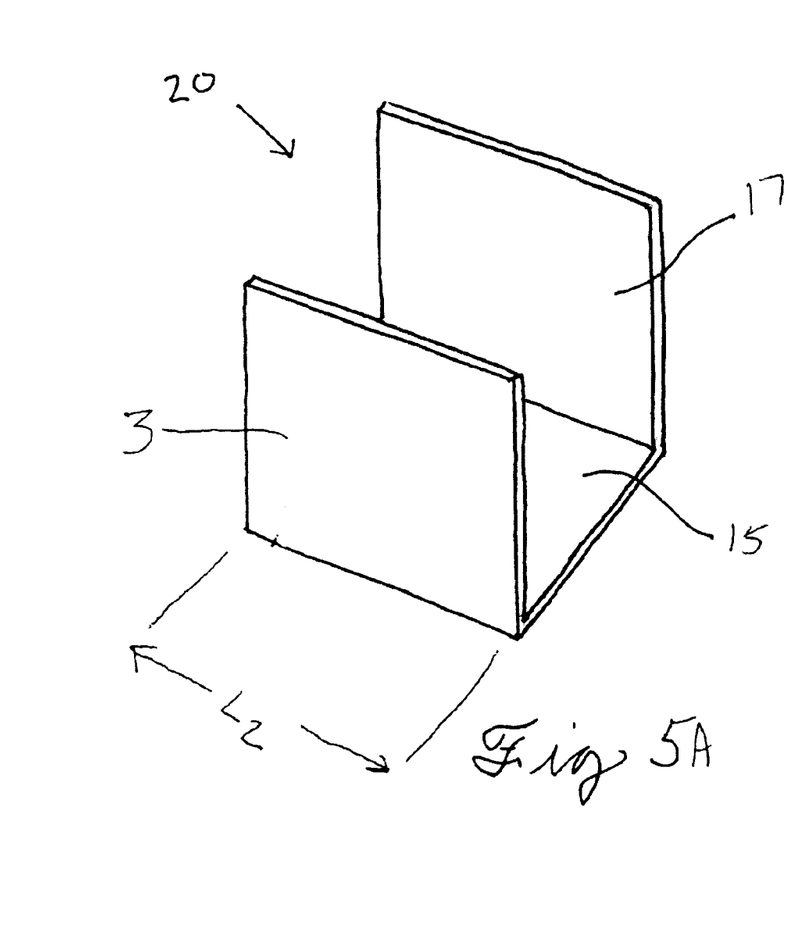
FIG. 5A shows a perspective view of a unshaped piece of sheet steel stock useful in providing a gas scrubbing apparatus according to one method of manufacturing a device according to the invention.
Figure 5B:
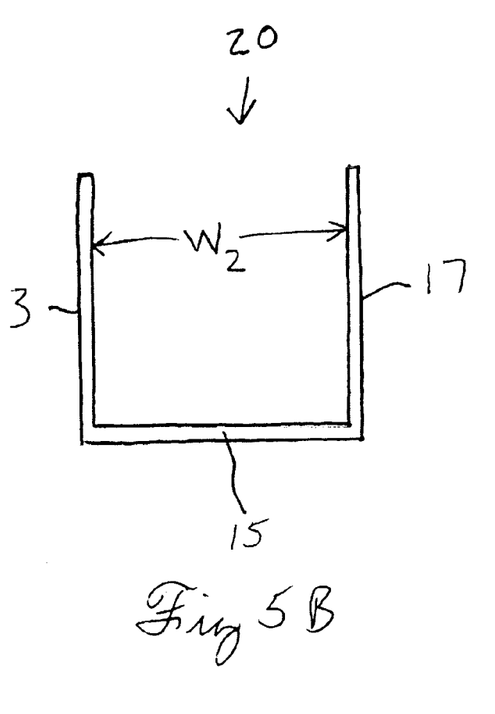
FIG. 5B shows an end view of a unshaped piece of sheet steel stock useful in providing a gas scrubbing apparatus according to one method of manufacturing a device according to the invention.

FIG. 5A shows a perspective view of a u-shaped piece of sheet steel stock 20 useful in providing a gas scrubbing apparatus 10 according to the invention, the end view of which is shown in FIG. 5B. Such a u-shaped piece of steel stock 20 is but one convenient means by which an apparatus according to the invention may be provided. When this means for manufacture is chosen, one of the walls serves as the front wall portion 3 of the apparatus, and one of the walls serves as the rear wall portion 17, and the bottom portion 15 of the u-shaped steel stock 20 serves as the bottom portion 15 of an apparatus 10 according to the invention. In its employment, the u-shaped piece of steel stock 20 has a width dimension $W_2$, which is only slightly wider than the width dimension $W_1$ of the gas manifold 69, and a length dimension $L_2$, which is only slightly wider than the length dimension $L_1$ of the gas manifold 69. Such provisions enable the gas manifold 69 to be placed within the confines of the walls comprising the front wall portion 3 and rear wall portion 17 so that the end portions of the gas manifold 69 are substantially aligned with the ends of the u-shaped steel stock 20. Subsequent to such placement, steel stock having the dimensions of the left side wall portion 11 and right side wall portion 13 are welded in place at the open end portions of the u-shaped steel stock 20, and a suitably shaped top portion 9 is welded in place on the top of the assembly, to provide an apparatus as shown in FIGS. 1, 2 and 3. The left side wall portion 11 is equipped with a hole disposed through it to which a piece of pipe is attached to provide the gas inlet 5, which serves as a convenient means for attaching a conduit which supplies a gas needing to be scrubbed of impurities to the apparatus 10 for treatment. The right side wall portion 13 is equipped with a hole disposed through it to which a piece of pipe is attached to provide the gas outlet 7, which serves as a convenient means for attaching a conduit to convey the gas which has been scrubbed of impurities to any desired location for venting to the atmosphere or for further treatment, if desired or necessary. The right side wall portion is also provided with two holes disposed through it which serve as locations for filling and draining the apparatus of a liquid absorbent substance, such as an alkaline liquid for cases where the apparatus 10 is to be used in scrubbing acidic impurities from gas streams. The locations of these holes are at the specified liquid inlet 19 and liquid drain 21, as previously described, and preferably conveniently comprise a protruding circular boss having a threaded interior wall that is adapted to receive a pipe plug for sealingly containing the liquid absorbent substance within the interior confines of the apparatus welded over each of the holes, similar to the drain on the crankcase of a combustion engine and identical in function thereto.

According to an alternative means for manufacturing an apparatus according to the invention, a hollow box shaped substantially in the form of a rectangular solid comprising a bottom portion and four side wall portions is employed, whose interior dimensions coincide with the length, width and height dimensions of the gas manifold 69. The gas manifold 69 is dropped into such box and welded in place as previously stated, to define the chamber 29 (FIG. 6) and a top portion is subsequently welded in place in the location of the top portion to comprise a sealed box having the gas manifold 69 tightly housed therein. The gas inlet 5, gas outlet 7, liquid inlet 19, and liquid drain 21 are provided as previously described.

Figure 6:
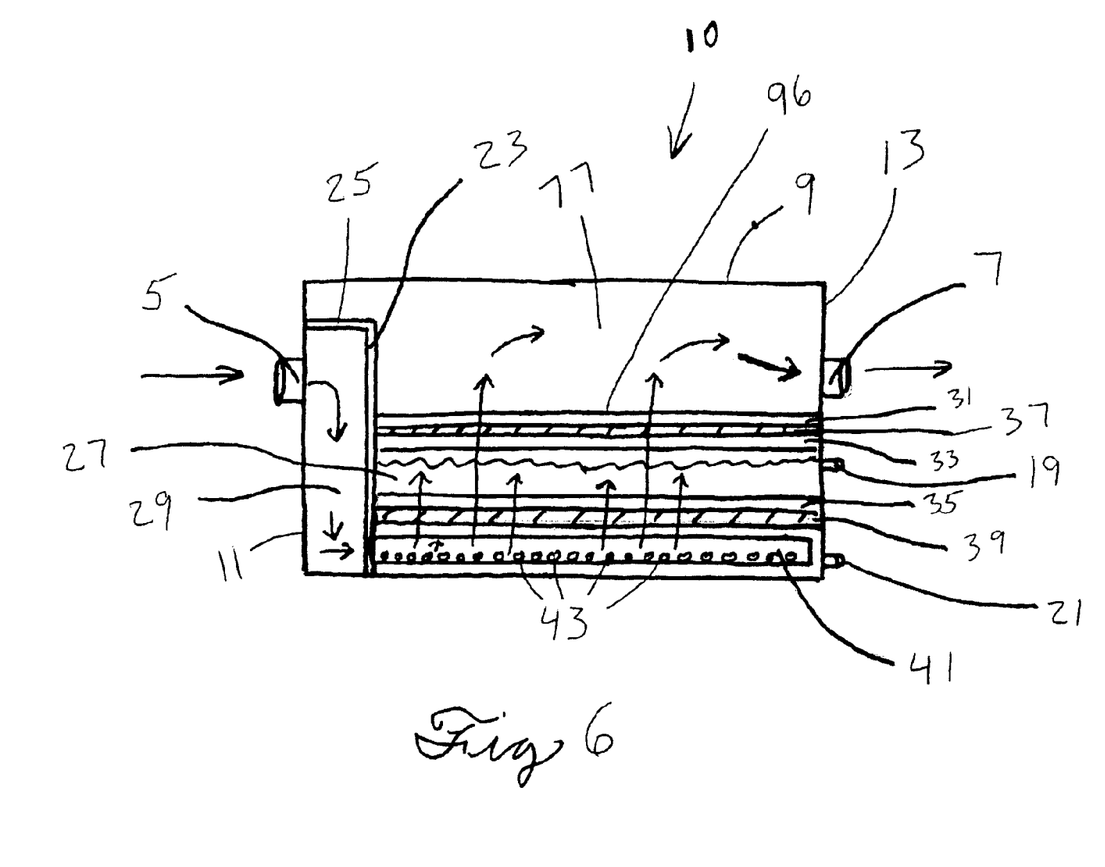
FIG. 6 shows a cross section view of an assembled apparatus according to a preferred form of the invention.

FIG. 6 shows a cross section view of an assembled apparatus according to a preferred form of the invention. In this figure, the purpose of the plate top portion 25 is evident. Prior to the affixing the top portion 9 to the apparatus, the line of intersection between where the edge portion 92 (FIG. 4A) of the plate top portion 25 contacts the left side wall portion 11 is sealed along its length, for example, with a weld bead. Also, the points at which the side edge portions 84 and 86 (FIG. 4A) of the plate portion 23 and the end portions 88 and 90 (FIG. 4A) of the plate top portion 25 contact the front wall portion 3 and rear wall portion 17 are all sealed along the length of these junctions as well, such as with a weld bead. Such provision thus defines a sealed chamber 29, defined by the plate portion 23, plate top portion 25, portions of each of the left side wall portion 11 and portions of the front wall portion 3 and the rear wall portion 17, into which chamber 29 all gas inputted to the apparatus 10, represented by arrows in this FIG. 6, must enter. This chamber 29 is thus precluded from being in direct fluid contact with the headspace 77 in the remainder of the inner confines of the apparatus 10, particularly when the liquid absorbent substance 27 is disposed in the device in its normal use, at a level as shown. Preferably, the volume of the sealed chamber 29 disposed within the enclosure is between about 4000 cubic centimeters and 800,000 cubic centimeters, excluding the volume contained in the gas conduction tubes.

During operation of a gas scrubbing apparatus 10 according to the invention, the gas to be scrubbed enters the gas inlet 5 at a pressure greater than atmospheric by an amount in the range of between about 0.1 psi and about 20 psi above atmospheric pressure, and travels down through chamber 29 in the direction of the arrows until it encounters the plurality of holes 47 in the gas manifold 69. The gas to be scrubbed enters the gas conduction tubes 41 through the holes 47 and exits the holes 43 which are disposed through the walls of the gas conduction tubes, and contacts the liquid absorbent substance 27, with which acidic components present in the gas to be scrubbed chemically react in the case where the liquid absorbent substance 27 is alkaline, to form a neutralization product, such as a salt or adduct, by reaction with an alkaline substance in the liquid absorbent substance. Alternatively, the gas to be scrubbed may comprise an undesirable alkaline component, such as a volatile amine compound, and the liquid absorbent substance may comprise an acidic substance. The gas, having been relieved of its undesirable constituent(s) then passes into the headspace 77 and is directed outside of the apparatus 10 via the gas outlet 7 for further treatment, analysis, or venting to the atmosphere.

According to a preferred form of the invention, there is a layer of metal mesh 39 which rests on the top surface of the gas conduction tubes 41, which metal mesh may be any metallic mesh which does not restrict the flow of gas, whose function is to aid in distribution of gas into the liquid phase. According to one preferred form of the invention, the metal mesh is 4-ply material wherein each layer has holes ½ centimeter by 1 centimeter. However other metal meshes may be used, including meshes comprising carbon steel, Teflon® polymers, stainless steel and various plastics having a mesh size between about ½ centimeter and 1 centimeter or any metallic element or alloy which is not attacked by the liquid absorbent substance. There is also provided a sheet of expanded metal 35 which rests on top of the metal mesh 39 for the purpose of supporting the metal mesh. The sheets of metal mesh 39 and expanded metal 35 are both submerged beneath the surface of the liquid absorbent substance 27. The expanded metal may comprise any expanded metal having openings in the range of between ½ and 1.5 square inches in area which is comprised of iron, steel, titanium, Teflon® polymers, other plastics (PE, PP, PVC, etc.) or any metallic element or alloy which is not attacked by the liquid absorbent substance.

There is also a "sandwich" comprising a sheet of expanded metal 33 and a sheet of expanded metal 31 having a sheet of metallic mesh 37 disposed therebetween. The materials from which these expanded metal sheets and metal mesh may be comprised are the same as mentioned above. This sandwich serves as a baffle, for cases when sudden increases in line pressure of the gas to be scrubbed occur, to prevent the liquid absorbent substance 27 from being forced out of the gas outlet 7 in liquid form. This baffle means is held in place above the top surface of the liquid absorbent substance 27 (and preferably substantially parallel to the surface of the liquid absorbent substance 27), by conventional means which may comprise an angle bracket disposed at each of the four corners of the "sandwich" which comprises the baffle means. The top surface of the baffle means 96 is preferably below the lowest portion of the opening of the gas outlet 7. Also shown in FIG. 6 are the respective locations of the liquid inlet 19 and the liquid drain.

As mentioned, an apparatus according to the invention operates to scrub undesirable substances from gas streams by causing contact with the gas to be scrubbed and a liquid absorbent substance 27. The liquid absorbent substance 27 may be any substance which is capable of undergoing a chemical reaction with an undesirable chemical species present in the gas to be scrubbed. Thus, the present invention contemplates the use of alkaline substances as the liquid absorbent substance, for cases when it is desired to remove acidic components from the gas to be scrubbed. Likewise, the present invention contemplates the use of acidic substances as the liquid absorbent substance, for cases when it is desired to remove alkaline or basic components from the gas to be scrubbed. In either case, both aqueous and non-aqueous liquid absorbent substances may be used, as such are known in the chemical arts.

One use for which the present invention is particularly suited is for removing hydrogen sulfide gas from gaseous hydrocarbons. In such employment, the preferred liquid absorbent substance may be any substance used in the prior art for scrubbing hydrogen sulfide from gaseous hydrocarbons, including amino compounds. Preferred materials useful as the liquid absorbent substance in instances where hydrogen sulfide is to be scrubbed include triazine; caustic soda solutions; zinc oxide solutions; and alkanolamines, including without limitation: triethanolamine, diethanolamine, and monoethanolamine.

One unique aspect of an apparatus according to the invention 10 is its ability to scrub hydrogen sulfide from gaseous streams which are present at a pressure which is only slightly in excess of atmospheric pressure. This is accomplished by having the height of the liquid absorbent substance present in an apparatus 10 according to the invention to be about 14 centimeters from the bottom portion 15. Thus the depth of the liquid absorbent substance within an apparatus according to the invention is preferably between about 10 centimeters and 18 centimeters.

An apparatus according to the invention may take on any length and any width dimension. The length of the apparatus may be any length between about 25 centimeters long to 200 centimeters long. The width of the apparatus may be any width between about 20 centimeters wide to 250 centimeters wide.

Although the preferred embodiment shown in the various figures comprises 5 gas conduction tubes 41, the scope of the present invention is not so limited to gas manifolds 69 having 5 gas conduction tubes 41. The present invention includes the use of any number of gas conduction tubes 41 between about 1 and 50 or more, depending on the volume of gas to be scrubbed. Most typically, however, the number of gas conduction tubes 41 employed will be between about 3 and about 8. The number of holes 43 disposed through the gas conduction tubes 41 may be any number of holes. The preferred cross sectional area of the gas conduction tubes 41 is in the range of between about 1.5 square centimeters to about 8 square centimeters, with a cross sectional area of about 3 square centimeters being most preferable. Preferably, the holes 43 are circular, but the present invention includes the use of other geometries for these holes 43, including without limitation square holes, oval holes, etc. When the holes 43 are circular, their preferred diameter is any diameter in the range of between about 1.5 millimeters to about 5 millimeters, with a diameter of 3 millimeters being most preferred. Preferably, there are between about 4 holes and about 8 holes for every 25 centimeters of length of a given gas conduction tube 41. When the holes 43 are not circular, their preferred cross sectional area is in the range of between about 0.4 square centimeters to about 1.2 square centimeters, with a cross sectional area of about 0.8 square centimeters being most preferable. Additionally, the invention includes the use of holes of varying size disposed about the length of the gas conduction tubes 41.

Consideration must be given to the fact that although this invention has been described and disclosed in relation to certain preferred embodiments, obvious equivalent modifications and alterations thereof will become apparent to one of ordinary skill in this art upon reading and understanding this specification and the claims appended hereto. Accordingly, the presently disclosed invention is intended to cover all such modifications and alterations, and is limited only by the scope of the claims which follow.

I claim:

1. A device useful for scrubbing contaminants from gaseous streams comprising:
   a) an enclosure comprising a bottom portion, a rear wall portion, a front wall portion, a left side wall portion and a right side wall portion, wherein said left side wall portion and said right side wall portion each include a hole disposed therethrough, one of said holes being a gas inlet and the remaining hole being a gas outlet; and
   b) a gas manifold portion comprising:
      i) a substantially vertically disposed plate portion, said plate portion having an upper end portion, a lower end portion, two side edge portions, and a plurality of holes disposed through it along its lower end portion,
      ii) a plurality of gas conduction tubes coinciding with the number of plurality of holes disposed through said plate portion along its lower end portion, each of said gas conduction tubes having a top surface portion, a first open end portion and a second closed end portion, wherein said open end portion of each of said gas conduction tubes are affixed over said holes disposed through said plate portion, said gas conduction tubes each comprising a plurality of holes disposed along their lengths,
      iii) a substantially horizontally disposed plate top portion having two end portions and two edge portions located at the upper end portion of the plate portion such that the angle of intersection the plate top portion makes with the plate portion is any angle between about 45 degrees and 135 degrees,
   wherein said lower end portion of said plate portion is sealed along its length to said bottom portion of said enclosure, and wherein each of said side edge portions of said plate portion are sealed along each of their lengths to said front wall portion and said rear wall portion of said enclosure, respectively, and wherein each of said end portions of said plate top portion are sealed along their lengths to said front wall portion and said rear wall portion of said enclosure and wherein the edge portion of said plate top portion which does not intersect with said plate portion is sealed along its length to said left side wall portion of said enclosure, thus defining a sealed chamber defined by said plate portion, said plate top portion, a portion of said front wall portion of said enclosure, a portion of said rear wall portion of said enclosure, and a portion of said left side wall portion.

2. A device according to claim 1 wherein at least one of said right side wall, left side wall, front wall or rear wall portions include two holes disposed through it for charging and draining said device with a liquid absorbent substance.

3. A device according to claim 1 wherein said plurality of holes disposed through said plate portion at its lower end portion comprises any number of holes between about 2 and about 20.

4. A device according to claim 1 wherein said plurality of gas conduction tubes is any number between about 2 and about 20.

5. A device according to claim 1 wherein the plurality of holes disposed along the lengths of each of said gas conduction tubes comprises any number of holes between about 8 holes and about 16 holes for every 2.5 centimeters of length of said gas conduction tube.

6. A device according to claim 1 wherein each of the holes in said plurality of holes disposed along the lengths of each of said gas conduction tubes have a cross sectional area of any value in the range of between about 0.4 square centimeters to about 1.2 square centimeters.

7. A device according to claim 1 wherein each of the holes in said plurality of holes disposed along the lengths of each of said gas conduction tubes are round and have a diameter of any value in the range of between about 1.5 millimeters to about 4.5 millimeters.

8. A device according to claim 1 wherein the plurality of holes disposed along the lengths of each of said gas conduction tubes are disposed so that there are between about 8 holes and 16 holes for every 25 millimeters of length of said gas conduction tubes.

9. A device according to claim 1 having a length dimension between about 20 centimeters and about 200 centimeters, a width dimension between about 20 centimeters and about 200 centimeters, and a height dimension between about 1 centimeters and about 8 centimeters.

10. A device according to claim 1 further comprising a sheet of metal mesh disposed across substantially all of said top surface portion of said gas conduction tubes.

11. A device according to claim 10 further comprising a sheet of expanded metal disposed on the top of said sheet of metal mesh.

12. A device according to claim 11 further comprising a baffle means which comprises a sheet of metal mesh disposed between two sheets of expanded metal, wherein said baffle means is disposed above the top surface of the liquid absorbent substance and wherein the top surface of the baffle means is below the lowest portion of the opening of said gas outlet.

13. A device according to claim 1 further comprising a liquid absorbent substance present within said enclosure, wherein the top surface of said liquid absorbent substance is above the top surface of said gas conduction tubes, and further comprising a baffle means which comprises a sheet of metal mesh disposed between two sheets of expanded metal, wherein said baffle means is disposed above the top surface of the liquid absorbent substance and wherein the top surface of the baffle means is below the lowest portion of the opening of said gas outlet.

14. A device according to claim 13 wherein the angle of intersection of the plate top portion and the plate portion is about 90 degrees.

15. A device according to claim 1 wherein the volume of said sealed chamber disposed within said enclosure is between about 4000 cubic centimeters and 800,000 cubic centimeters, excluding the volume contained in the gas conduction tubes.

16. A device according to claim 1 further comprising a liquid absorbent substance present within said enclosure, wherein the top surface of said liquid absorbent substance is above the top surface of said gas conduction tubes, but below the lowest portion of the opening of said gas outlet.

17. A device according to claim 1 further comprising a liquid absorbent substance present within said enclosure, wherein the liquid absorbent substance is disposed so that its top surface is above the top surface of said gas conduction tubes, and further comprising a baffle means which comprises a sheet of metal mesh disposed between and in contact with each of two sheets of expanded metal, and wherein the top surface of said liquid absorbent substance is below the bottom surface of said baffle means.

18. A device according to claim 16 wherein said liquid absorbent substance is selected from the group consisting of: acidic liquids and alkaline liquids.

19. A device according to claim 18 wherein said liquid absorbent substance is alkaline and is selected from the group consisting of: triazine, alkanolamines, aqueous caustic soda, monoethanolamine, diethanolamine, and triethanolamine.

20. A process for scrubbing a gaseous substance having an undesired impurity present comprising the step of feeding said gaseous substance into said gas inlet of a device according to claim 16, wherein said gaseous substance is at a pressure of between about 0.1 psi and about 20 psi above the ambient pressure.

21. A process according to claim 20 wherein said impurity comprises hydrogen sulfide.

22. A process for scrubbing a gaseous substance having an undesired impurity present comprising the step of feeding said gaseous substance into said gas inlet of a device according to claim 17, wherein said gaseous substance is at a pressure of between about 0.1 psi and about 20 psi above the ambient pressure.

23. A process according to claim 22 wherein said impurity comprises hydrogen sulfide.

24. A process for scrubbing a gaseous substance having an undesired impurity present comprising the step of feeding said gaseous substance into said gas inlet of a device according to claim 18, wherein said gaseous substance is at a pressure of between about 0.1 psi and about 20 psi above the ambient pressure.

25. A process according to claim 24 wherein said impurity comprises hydrogen sulfide.

26. A process for scrubbing a gaseous substance having an undesired impurity present comprising the step of feeding said gaseous substance into said gas inlet of a device according to claim 19, wherein said gaseous substance is at a pressure of between about 0.1 psi and about 20 psi above the ambient pressure.

27. A process according to claim 26 wherein said impurity comprises hydrogen sulfide.

* * * * *